US009447996B2

(12) United States Patent
Dube

(10) Patent No.: US 9,447,996 B2
(45) Date of Patent: Sep. 20, 2016

(54) CARBON DIOXIDE REMOVAL SYSTEM USING ABSORPTION REFRIGERATION

(71) Applicant: ALSTOM Technology Ltd., Baden (CH)

(72) Inventor: Sanjay Kumar Dube, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 245 days.

(21) Appl. No.: 13/741,674

(22) Filed: Jan. 15, 2013

(65) Prior Publication Data
US 2014/0196481 A1    Jul. 17, 2014

(51) Int. Cl.
| F25B 29/00 | (2006.01) |
| B01D 53/14 | (2006.01) |
| F25B 27/00 | (2006.01) |
| B01D 53/34 | (2006.01) |
| B01D 53/62 | (2006.01) |
| F23J 15/06 | (2006.01) |
| F25B 15/04 | (2006.01) |
| F25B 15/06 | (2006.01) |

(52) U.S. Cl.
CPC ........... *F25B 27/00* (2013.01); *B01D 53/1475* (2013.01); *B01D 53/343* (2013.01); *B01D 53/62* (2013.01); *F23J 15/06* (2013.01); *B01D 2252/102* (2013.01); *B01D 2258/0283* (2013.01); *F23J 2215/50* (2013.01); *F25B 15/04* (2013.01); *F25B 15/06* (2013.01); *Y02C 10/04* (2013.01); *Y02C 10/06* (2013.01); *Y02E 20/14* (2013.01); *Y02E 20/16* (2013.01); *Y02E 20/363* (2013.01)

(58) Field of Classification Search
CPC .................. B01D 53/1475; F25B 29/006
See application file for complete search history.

(56) References Cited

U.S. PATENT DOCUMENTS

| 1,897,725 | A | 2/1933 | Gaus et al. |
| 2,043,109 | A | 6/1936 | McKee et al. |
| 2,106,734 | A | 2/1938 | Gollmar |
| 2,487,576 | A | 11/1949 | Meyers |
| 2,608,461 | A | 8/1952 | Frazier |
| 2,878,099 | A | 3/1959 | Breuing et al. |
| 3,255,233 | A | 6/1966 | Kunze et al. |
| 3,743,699 | A * | 7/1973 | Bogart .......................... 423/359 |

(Continued)

FOREIGN PATENT DOCUMENTS

| DE | 469840 | 12/1928 |
| DE | 2832493 | 7/1978 |

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Duane Smith
*Assistant Examiner* — Cabrena Holecek
(74) *Attorney, Agent, or Firm* — Cynthia W. Flanigan

(57) ABSTRACT

A carbon dioxide removal system includes a chilled ammonia carbon capture system; an absorber refrigeration system in fluid communication with the chilled ammonia system; and a heat recovery steam generator (HRSG) in fluid communication with the chilled ammonia system and the absorber refrigeration system.

13 Claims, 7 Drawing Sheets

(56) References Cited

U.S. PATENT DOCUMENTS

| | | |
|---|---|---|
| 3,923,955 A | 12/1975 | Fattinger |
| 4,515,760 A | 5/1985 | Lang et al. |
| 4,847,057 A | 7/1989 | Brugerolle et al. |
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii et al. |
| 5,354,545 A | 10/1994 | Buisman |
| 5,378,442 A | 1/1995 | Fujii et al. |
| 5,427,759 A | 6/1995 | Heitmann |
| 5,453,115 A | 9/1995 | Vuletić |
| 5,458,663 A | 10/1995 | Teague et al. |
| 5,462,583 A | 10/1995 | Wood et al. |
| 5,533,338 A | 7/1996 | Lee et al. |
| 5,599,508 A | 2/1997 | Martinelli et al. |
| 5,648,053 A | 7/1997 | Mimura et al. |
| 5,700,311 A | 12/1997 | Spencer |
| 5,736,115 A | 4/1998 | Iijima et al. |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,228,145 B1 | 5/2001 | Falk-Pedersen et al. |
| 6,258,151 B1 | 7/2001 | Häarle et al. |
| 6,344,177 B1 | 2/2002 | Littleford |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,667,347 B2 | 12/2003 | O'Rear et al. |
| 6,689,332 B1 | 2/2004 | Yoshida et al. |
| 6,720,359 B2 | 4/2004 | O'Rear et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,192,468 B2 | 3/2007 | Mak et al. |
| 7,204,867 B2 | 4/2007 | Nielsen et al. |
| 7,244,405 B2 | 7/2007 | Thielert |
| 7,255,842 B1 | 8/2007 | Yeh et al. |
| 7,377,967 B2 | 5/2008 | Reddy et al. |
| 7,424,808 B2 | 9/2008 | Mak |
| 7,485,275 B2 | 2/2009 | Asprion et al. |
| 7,597,746 B2 | 10/2009 | Mak et al. |
| 7,637,987 B2 | 12/2009 | Mak |
| 7,758,673 B2 | 7/2010 | Brok et al. |
| 7,892,509 B2 | 2/2011 | Iijima et al. |
| 7,927,403 B2 | 4/2011 | Versteeg et al. |
| 2003/0045756 A1 | 3/2003 | Mimura et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0150813 A1 | 7/2006 | Tognazzo |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1 | 3/2008 | Gal |
| 2008/0178733 A1 | 7/2008 | Gal |
| 2008/0307968 A1 | 12/2008 | Kang et al. |
| 2009/0101012 A1 | 4/2009 | Gal et al. |
| 2009/0155889 A1 | 6/2009 | Handagama et al. |
| 2009/0282977 A1 | 11/2009 | Koss |
| 2010/0021362 A1 | 1/2010 | Hunwick |
| 2010/0092359 A1 | 4/2010 | Svendsen et al. |
| 2010/0107875 A1 | 5/2010 | Koss et al. |
| 2010/0229723 A1 | 9/2010 | Gelowitz et al. |
| 2011/0173981 A1 | 7/2011 | Dube et al. |
| 2011/0304155 A1* | 12/2011 | Hoffmann et al. ........... 290/1 R |
| 2012/0180521 A1* | 7/2012 | Erickson .................... 62/617 |

FOREIGN PATENT DOCUMENTS

| | | |
|---|---|---|
| DE | 3633690 | 4/1988 |
| EP | 0243778 | 11/1987 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 02/09849 | 2/2002 |
| WO | 2005/087351 | 9/2005 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. And Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

Carbon Capture Journal—"CO2CRC HS Capture Project—investigating capture technology with Australian brown coal—Boosan Babcock OxyCoal test" Issue 11, Sep.-Oct. 2009.

* cited by examiner

COP for Mechanical Refrigeration System as a function of Ambient Temperature

Electrical Consumption for Mechanical Refrigeration System as a function of Ambient Temperature Electrical Consumption for Absorption Refrigeration System as a function of $COP_{th}$ Delta between Mechanical and Absorption Refrigeration System as a function of Ambient Temperature —♦— with stripper overhead heat integration
—■— w/o stripper overhead heat integration

CARBON DIOXIDE REMOVAL SYSTEM USING ABSORPTION REFRIGERATION

TECHNICAL FIELD

The present disclosure generally relates to increasing the efficiency of carbon capture systems and reducing the power consumed during carbon capture processing. More specifically, the present disclosure relates to a system and method for reducing the power needed to perform a carbon capture process, especially a system and method for reducing the power needed to perform the Chilled Ammonia Process (CAP) by using an alternative refrigeration system to a mechanical refrigeration system.

BACKGROUND

Most of the energy used in the world today is derived from the combustion of carbon and hydrogen containing fuels such as coal, oil and natural gas. In addition to carbon and hydrogen, these fuels contain oxygen, moisture and contaminants such as ash, sulfur, nitrogen compounds, chlorine, mercury and other trace elements. Awareness of the damaging effects of the contaminants released during combustion triggers the enforcement of even more stringent limits on emissions from power plants, refineries and other industrial processes. There is an increased pressure on operators of such plants to achieve near zero emission of contaminants and to reduce carbon dioxide ($CO_2$) emission.

The art teaches various processes and technologies designed in an attempt to reduce the emission of contaminants from combustion gases. For example, baghouses, electrostatic precipitators and wet scrubbers may be employed in some processes to capture particulate matter. Various chemical processing also may be employed to reduce sulfur oxides, hydrogen chloride (HCl) and hydrogen fluoride (HF) emissions. Additionally, combustion modifications and $NO_x$ reduction processes may be used to reduce $NO_x$ emissions.

Significant progress has been made in the last twenty to thirty-five years and plants today are much cleaner and safer to the environment than in the past. However, there are growing indications that even small concentrations of particulate matter and especially the very fine, less than 2.5 micron size particles (referred to as "PM2.5"), sulfur oxides, acid mist and mercury may be harmful to human health and need to be controlled. Additionally, in the last few years, there has been a growing concern related to the accumulation of $CO_2$, a greenhouse gas, in the atmosphere. The accelerated increase of $CO_2$ concentration in the atmosphere is attributed to the growing use of fuels, such as coal, oil and gas, which release billions of tons of $CO_2$ into the atmosphere every year.

Reduction in $CO_2$ emission can be achieved by improving efficiency of energy utilization, by switching to lower carbon concentration fuels and by using alternative, $CO_2$ neutral, energy sources. However, $CO_2$ emitting fuels will likely continue to be the main source of energy in the foreseeable future. Consequently, a low cost, low energy consuming process for capturing and sequestering $CO_2$ is needed to assist in reversing the trend of global warming.

One such process for capturing and sequestering $CO_2$ is the Chilled Ammonia Process (CAP) developed by Alstom Power. The chilled ammonia capture method developed by Alstom could remove up to or greater than 90% of $CO_2$ from combustion gasses. The Chilled Ammonia Process is described in U.S. Patent Application No. 2008/0072762.

In the Chilled Ammonia Process, ultra cleaning of combustion gas to near zero concentration of residual contaminants followed by the capture of $CO_2$ is provided. The high removal efficiency of residual contaminants is accomplished by direct contact cooling and scrubbing of the gas with cold water. Through this chilling, the temperature of the combustion gas is reduced to 0° C. to 20° C. to achieve maximum condensation and gas cleaning effect. The $CO_2$ is then captured from the cooled and clean flue gas in a $CO_2$ absorber utilizing an ammoniated solution or slurry in the $NH_3$—$CO_2H_2O$ system. The absorber typically operates at 0° C. to 40° C. depending on the specific applications. Regeneration is accomplished by elevating the pressure and temperature of the $CO_2$ rich solution from the absorber. The $CO_2$ vapor pressure is high and a pressurized $CO_2$ stream, with low concentration of $NH_3$ and water vapor is generated. The high pressure $CO_2$ stream is cooled and washed to recover the ammonia and moisture from the gas.

Accordingly, as indicated above, the first step of the Chilled Ammonia Process is scrubbing and cooling the gas with cold water to reduce the temperature of the gas to 0° C. to 20° C. to achieve maximum condensation and gas cleaning effect. The combustion gas is cooled by passing the gas by Direct Contact Coolers (DCC). The coolers use chilled water to contact and cool the gas. The water is chilled using one or more mechanical refrigeration systems. The chilled water is then fed through the DCC, which reduces the temperature of the combustion gas, washes and scrubs the gas, captures residual contaminants in the gas, and lowers the moisture content of the gas. It should be understood that different variations of the Chilled Ammonia Process are known. As used herein, the Chilled Ammonia Process refers generally to any carbon capture process that includes the steps of cooling a combustion gas and using an ammoniated solution or slurry to remove $CO_2$ from the chilled gas. It is noted that the combustion gas is cooled not only in the DCC, but also in the absorber and water wash sections. Apart from cooling, a significant portion of the $CO_2$ absorption heat is also removed by using the referenced mechanical refrigeration system depending on the ambient conditions and specific applications.

It is further noted that the mechanical refrigeration systems employed in the afore-referenced CAP system for reducing $CO_2$ in combustion gases and which are used to cool the combustion gases require a significant amount of power. The necessary consumption of power materially decreases the efficiency of the power plant and increases the overall per unit cost of electricity produced by the power plant.

Regarding the afore-referenced mechanical refrigeration systems of the Chilled Ammonia Process, combustion gases are cooled with water chilled by one or more of these refrigeration systems. The water is chilled using vapor compression-direct expansion refrigeration cycles. With reference to FIG. 1 and as also shown in U.S. Patent Application No. 2011/0173981, a known vapor compression-direct expansion refrigeration cycle 123 is shown. The system includes a conduit 124 providing fluid communication between four elements: a compressor 122, a condenser 126, a throttle 128, and an evaporator 130. A refrigerant, i.e., working fluid, circulates in the conduit 124. The working fluid enters the compressor 122 as a vapor. The compressor 122 consumes power to isentropically compress the vapor. The working fluid exits the compressor 122 as a high pressure vapor and flows to the condenser 126. In the condenser 126, heat is rejected from the working fluid at constant pressure. The working fluid exits the condenser as saturated liquid. Next, the working fluid passes through the expansion valve 128 (also called throttle valve). The expansion valve 128 abruptly decreases the pressure of the working fluid at the required evaporation conditions, causing flash evaporation and auto-refrigeration. The liquid then travels through the evaporator 130 and is completely vaporized and sent to the compressor inlet, such that the vapor is directly sent to the compressor inlet. The vaporization absorbs surrounding energy, thereby providing the required cooling effect. The absorption of energy during this step is used to chill the water or process solutions for cooling the combustion gases. The resulting working fluid returns to the compressor 122, thereby completing the refrigeration cycle 123. The refrigeration cycle 123, and specifically the compressor, consumes significant power, thereby reducing the overall efficiency of the power plant.

Accordingly, there exists a need for systems and processes for reducing the power required to perform, e.g., the Chilled Ammonia Process for cleaning a combustion gas.

SUMMARY

According to aspects illustrated herein, there is provided a carbon dioxide removal system. The system comprises a chilled ammonia carbon capture system; an absorber refrigeration system in fluid communication with the chilled ammonia system; and a heat recovery steam generator (HRSG) in fluid communication with the chilled ammonia system and the absorber refrigeration system.

According to another aspect illustrated herein, there is provided a method for reducing power consumed during a carbon capture process. The method comprises, in a carbon dioxide removal system comprising: a chilled ammonia carbon capture system; an absorber refrigeration system in fluid communication with the chilled ammonia system; and a heat recovery steam generator (HRSG) in fluid communication with the chilled ammonia system and the absorber refrigeration system, contacting the chilled ammonia carbon capture system with the absorber refrigeration system without the use of a mechanical refrigeration system.

The above described and other features are exemplified by the following figures and in the detailed description.

BRIEF DESCRIPTION OF THE DRAWINGS

Referring now to the figures, which are exemplary embodiments, and wherein the like elements are numbered alike.

DETAILED DESCRIPTION

Figure 1:
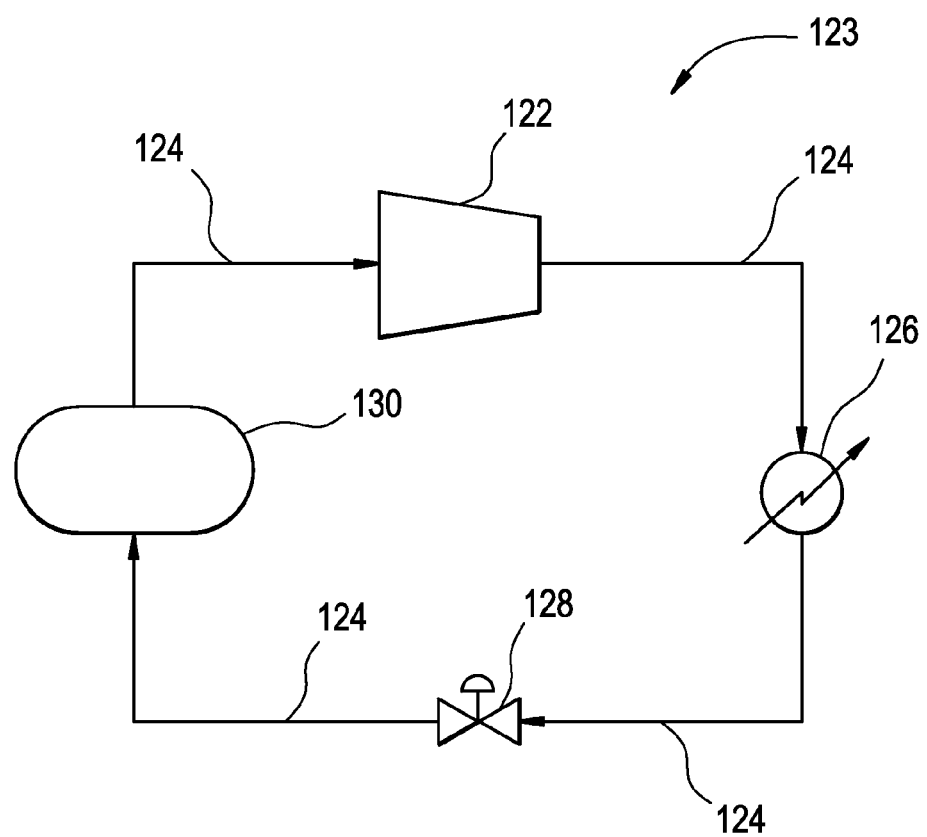
FIG. 1 is a schematic (Prior Art) illustrating a mechanical refrigerant cycle.
Figure 2:
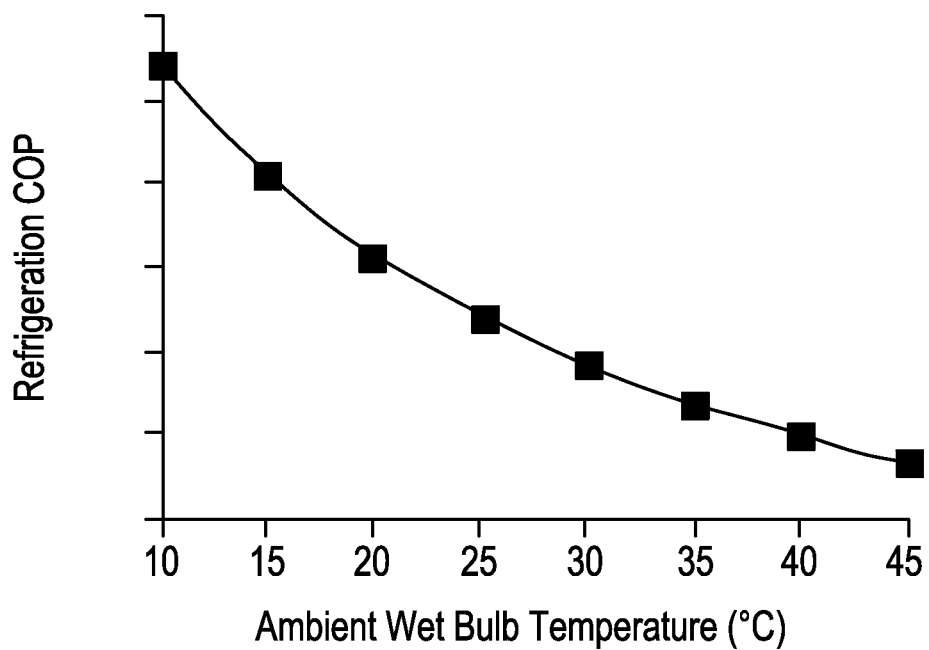
FIG. 2 is a graph depicting that mechanical refrigeration Coefficient of Performance (COP) decreases significantly with an increase in ambient temperature.

The inventor has determined an alternative to the use of mechanical refrigeration in carbon capture processing, particularly in the Chilled Ammonia Process (CAP). As explained above, in the Chilled Ammonia Process (CAP), a mechanical refrigeration system is employed to maintain the process conditions below ambient temperature. However, mechanical refrigeration consumes significant amount of electrical power and increases exponentially with an increase in the ambient temperature. For example, as shown in FIG. 2, mechanical refrigeration Coefficient of Performance (COP) decreases significantly with an increase in ambient temperature. Particularly, at these higher ambient conditions shown, e.g. in FIG. 2, the inventor has determined that use of an absorption refrigeration system (refrigerant absorber), such as an ammonia-water system or a LiBr-water system, as described in further detail below, is an attractive alternative to traditional mechanical refrigeration in terms of, e.g., reducing power consumption of the overall carbon capture system.

Accordingly, the inventor has determined that employing an absorption refrigeration system for, e.g., a combined cycle power plant where heat from an incoming gas stream (e.g., flue gas stream) in combination with heat from a CAP stripper overhead section can be used to drive the absorption refrigeration system, according to embodiments. In a CAP stripper, for example, the CAP stripper functions to separate a water/ammonia/$CO_2$ solution absorbed in the water wash column. The ammonia is returned to the $CO_2$ absorber for capture of $CO_2$, and water is returned to the water wash column for ammonia capture.

Flue gas from a combined cycle power plant typically has low concentrations of $CO_2$ (e.g., about 3 to about 5 volume percent) and thus has a high thermal duty per Megawatt electric (MWe) generation. To drive absorption refrigeration, the heat from the incoming gas stream, e.g. flue gas, can be extracted along with the heat from the CAP stripper overhead section, which can be between about 50 to about 60 percent of the regenerator duty from the combined cycle CAP process. Embodiments of the invention can recover the stripper overhead heat duty, which could otherwise would be wasted to the cooling water. Accordingly, embodiments described herein can reduce the operating cost of the CAP process at, e.g. higher ambient conditions, and especially reduce the operating cost of the refrigeration system for the CAP process. It is further noted that while the descriptions of the embodiments herein primarily refer to a combined cycle power plant, the descriptions are also applicable to, e.g., a PC (Pulverized Coal) based power plant.

Figure 3:
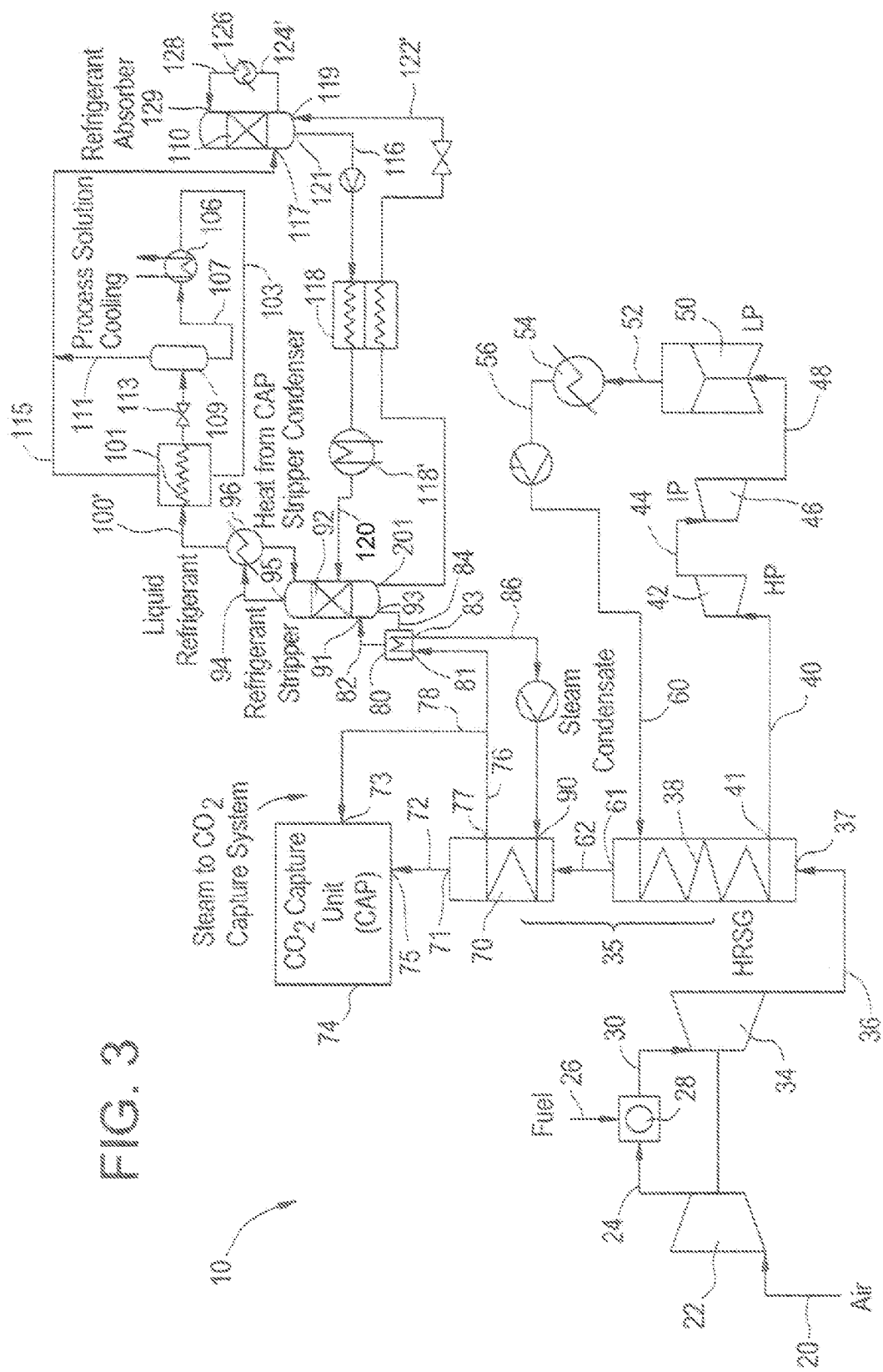
FIG. 3 is a schematic depiction of an integrated $CO_2$ capture system for a combined cycle power plant by using absorption refrigeration.

Referring now to FIG. 3, schematically depicted therein according to an embodiment is system 10, which is an integrated $CO_2$ capture system for a combined cycle power plant by using absorption refrigeration. As will be explained in further detail below, heat from the incoming gas stream, e.g., flue gas stream, in the heat recovery steam generator (HRSG) is extracted to drive the refrigerant from the refrigerant stripper and the absorbent from, e.g., the stripper bottom is recycled back to the refrigerant absorber to capture the incoming vapor refrigerant to complete the cycle. The steam from the HRSG can also be used within the CAP process, and the recovered refrigerant from the refrigerant stripper can be used to cool the process solution to the desired temperatures, as shown in FIG. 3.

As shown in FIG. 3, system 10 includes a $CO_2$ capture unit 74 in fluid communication with a HRSG 35, a reboiler 80, a refrigerant stripper 92 and a refrigerant absorber system (absorber refrigeration system) 110, described in further detail below. It has been determined that use of the absorber refrigeration system 110, as opposed to a mechanical refrigeration technique results in a significant reduction of overall power needed for the system 10.

In the exemplary system 10 shown in FIG. 3, air is initially injected into compressor 22 via stream 20 where the air is compressed and then exits the compressor 22 in stream 24. Stream 24 comprising the compressed air then enters combustion drum 28 where, e.g., natural gas such as fuel from stream 26 is injected into the combustion drum 28. Gas stream 30 comprising, e.g., flue gas, exiting the combustion drum 28 then enters turbine system 34 where the pressure of the gas stream 30 is reduced, and power is extracted and generated therein. This processing results in gas stream 30, e.g. flue gas exhaust, exiting the turbine system 34 in gas stream 36.

The HRSG 35 shown in FIG. 3 defines a first inlet 37 for receiving the gas stream 36, a first outlet 61 for exiting gas stream 62, and a second outlet 71 for exiting gas stream 72. A heat exchanger of the HRSG 35 includes an outlet 77 for stream 76 comprising steam and exiting the HRSG 35. The HRSG 35 further defines a second inlet 90 for receiving steam condensate from the reboiler 80 via stream 86.

Gas stream 36 entering the HRSG 35 is typically at an elevated temperature of about 600° C., however, it will be appreciated that the temperature of this stream, as well as the pressure, can vary depending upon, e.g., the particulars of the plant employed. As a non-limiting example, the temperature may be between about 200° C. and about 1000° C., and the pressure may be between about 1 bar and about 20 bars. Similarly, it will be further appreciated that the temperatures and pressures of the other various streams disclosed herein also could vary depending upon, e.g., the particulars of the plant, and so forth. The HRSG 35 cools the temperature of the entering gas stream 36 such that gas stream 72 exiting the second outlet 71 of the HRSG is at a temperature typically between about 50° C. to about 100° C. (at a pressure of about 1 bar), although it will be appreciated that other reduced temperatures are possible. It is noted that the HRSG 35 shown in FIG. 3, as well as in FIG. 4 described below, is typically a single unit operation, but has been schematically shown herein in two sections (sections 38 and 70) for clarity purposes and ease of reference. It will be appreciated that if, e.g., more heat is needed to be generated for the overall process, the temperature of gas stream 62 exiting HRSG first outlet 61 can be increased, accordingly. Alternatively, if less heat is required, the temperature of stream 62 can be reduced or cooled, and more heat could be extracted upstream, if needed. Thus, the temperature of gas stream 62, as well as the pressure, can be varied to meet desired processing needs.

Figure 4:
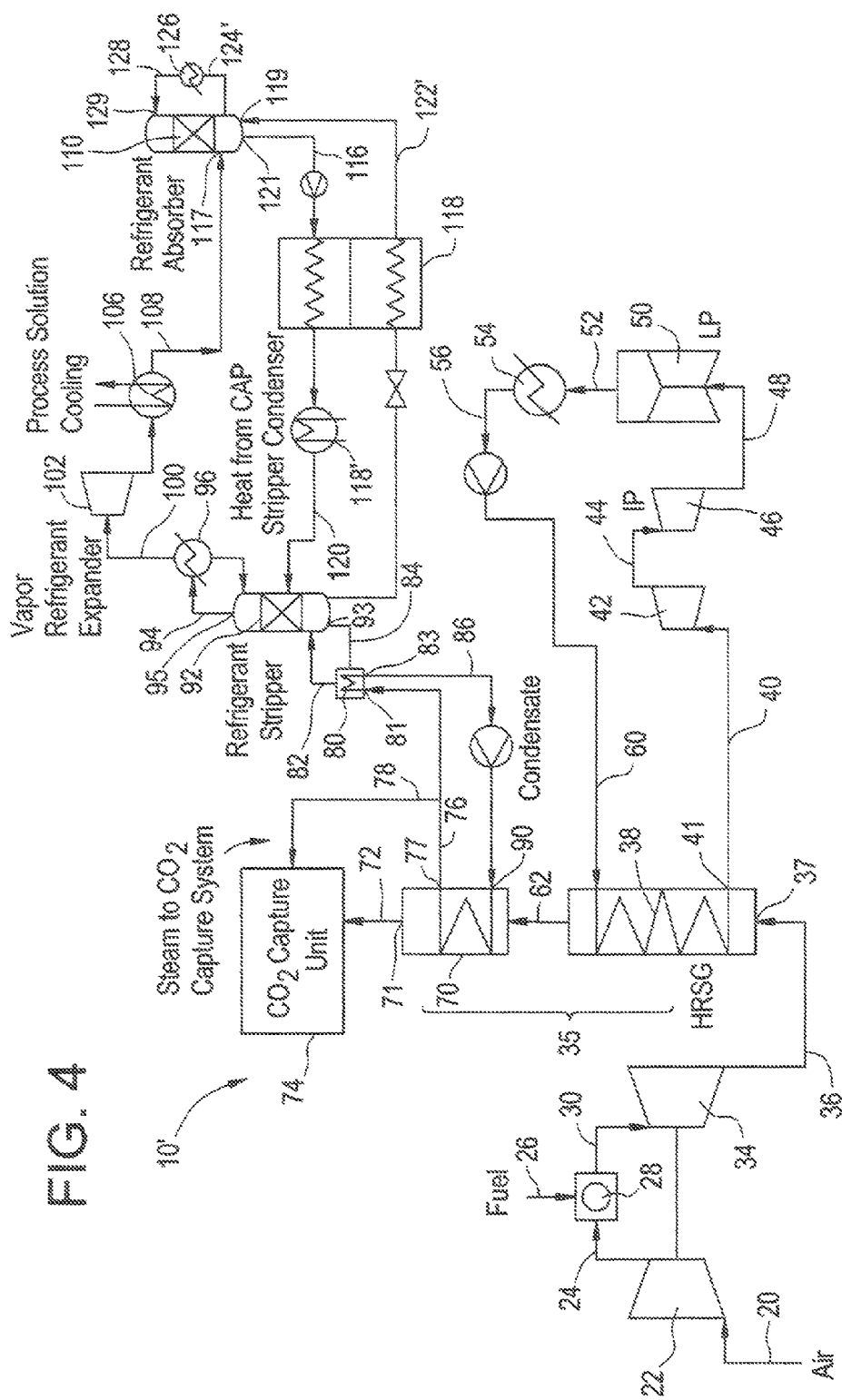
FIG. 4 is another schematic depiction of an integrated $CO_2$ capture system for a combined cycle power plant by using absorption refrigeration.

The HRSG 35 includes one or more heat exchangers, wherein at least one heat exchanger includes an outlet 41 in which stream 40 comprising high pressure steam exits and then enters high pressure steam turbine 42. Stream 44 thereafter exits the high pressure steam turbine 42 and enters intermediate pressure steam turbine 46. As further shown in FIG. 3, stream 48 exiting the intermediate pressure steam turbine 46 thereafter enters low pressure steam turbine 50. Stream 52 comprising steam exhaust exits the low pressure steam turbine 50 and enters condenser 54 in which the steam exhaust is condensed with the use of cooling water. Stream 56 thereafter exits the condenser 54 and is sent back to the HRSG via stream 60 to complete the steam cycle. As will be appreciated, the schematics of FIGS. 3 and 4 represent a high level view for illustrations purposes and thus additional streams, components, and so forth may be included in the systems described herein.

As further shown in FIG. 3, the $CO_2$ capture unit 74 of system 10, e.g., a Chilled Ammonia Process (CAP) system, defines a first $CO_2$ capture inlet 75 for receiving stream 72 (e.g., flue gas) and a second $CO_2$ capture inlet 73 for receiving steam from the HRSG 35 in stream 78 via stream 76 from the HRSG 35. The $CO_2$ capture unit 74 is in fluid communication with the HRSG 35 via stream 72, and the HRSG 35 is in further fluid communication with the refrigerant stripper 92 and refrigerant absorber 110 via reboiler 80 with use of, e.g., streams 76, 82 and 84. The CAP unit 74 can also receive the steam from the IP/LP crossover (stream 48), as per process requirements.

As explained above, in chilled ammonia processing, typically mechanical refrigeration systems are employed to cool the combustions gases and such mechanical systems require a significant amount of power. The inventor notes that the use of such mechanical refrigeration techniques are highly dependent upon ambient conditions. For instance, if a plant is located in a climate such as Canada, the ambient conditions are cooler than, e.g., a plant located in Arizona, and thus the refrigeration requirements are less at these cooler ambient conditions. However, at the higher ambient conditions, the mechanical refrigeration needs more power and thus is not as efficient or effective. Accordingly, system 10 comprising the absorber refrigeration system 110, as opposed to a mechanical refrigeration unit, can solve the afore-referenced problems encountered with some prior mechanical refrigeration techniques. More particularly, as a non-limiting illustration, the inventor has determined that at ambient wet bulb temperatures of, e.g., greater than about 5° C., specifically greater than about 10° C. and greater than about 15° C., including between about 10° C. and about 40° C., and between about 12° C. and about 25° C., more particularly between about 14° C. and about 22° C., the absorber refrigeration system (refrigerant absorber) described herein is effective and may be particularly more effective over mechanical refrigeration techniques. The absorber refrigeration system is particularly more effective than the mechanical refrigeration system at an ambient wet bulb temperature of greater than about 10° C. It is note that at temperatures less than or equal to about 10° C., an additional heat source, e.g., free heat source including heat from gas streams and so forth could be employed with use of the absorber refrigeration system.

Moreover, the inventor has determined that using heat generated from the stripper overhead section (e.g., see stream 120 from CAP stripper condenser 118' entering refrigerant stripper 92, described below) can reduce the amount of heat needed in the absorption refrigeration process thereby making the overall process more efficient.

As further shown in FIG. 3, system 10 comprises the reboiler 80 defining a first inlet 81 for receiving steam from the HRSG 35 via stream 76 and a first outlet 83 in which condensate from the reboiler 80 exits the first outlet 83 in stream 86. Accordingly, stream 86 comprises steam condensate as water in the liquid phase. The condensate from the reboiler 80 is sent to the HRSG 35 to create steam, which is sent back to the reboiler 80 via stream 76 to, e.g., boil off ammonia for an ammonia-water refrigeration system.

Refrigerant stripper 92 defines a first inlet 91 for receiving vapor stream 82 comprising water and ammonia from the reboiler 80. It will be appreciated, however, that steam/hot water or other heat source could be employed in lieu of the steam from the HRSG 35. During operation of the reboiler

80, liquid comprising ammonia and water is drawn from, e.g., the bottom of the refrigerant stripper 92 at stripper first outlet 93. The liquid comprising ammonia and water enters the reboiler 80 via stream 84 where it is heated with steam from stream 76 to form the vapor stream 82 for reentry into the refrigerant stripper 92, the objective being to boil off the ammonia and retain the water, as will be appreciated.

The refrigerant stripper 92 further defines a first refrigerant stripper outlet 95, wherein stream 94 exits, e.g., the top of the refrigerant stripper 92, and also defines a second refrigerant (absorbent) outlet 201 releasing primarily water with traces of ammonia. It is noted that stream 94 comprises vapor and is condensed in the liquid form in the condenser 96 using, e.g., a cooling medium such as cooling water. It is further noted that any suitable refrigerant may be employed, such as the use of a lithium-bromide system, an ammonia-water system, ammonia, combinations thereof, and so forth. An ammonia refrigerant will be referred to herein for ease of reference, but in no way is meant to limit the refrigerant to this particular composition.

As further shown in FIG. 3, stream 94 enters condenser 96 where it is cooled and exits the condenser 96 in stream 100' as, e.g., substantially pure liquid refrigerant (ammonia), which then enters heat exchanger 101 for further cooling. The pressure of the liquid refrigerant can be further reduced via control valve 113. The reduced pressure liquid refrigerant then enters separator 109, wherein a first stream 111 comprising ammonia vapor (e.g., substantially 99.9 percent ammonia) enters stream 115 exiting the heater 101 and which comprises heated ammonia. A second stream 107 comprising liquid ammonia exits, e.g., the bottom of the separator 109 and is sent to heat exchanger 106 (evaporator) for process cooling. Stream 107 comprises liquid ammonia refrigerant at the desired conditions of the evaporator 106 for process cooling. The stream 107 is evaporated in evaporator 106 and then returns to the absorber via heat exchanger 101. This evaporation of the liquid refrigerant provides the required cooling effect for the CAP process.

Stream 115 exiting the heat exchanger 101 and comprising heated ammonia vapor enters refrigerant absorber 110 via refrigerant absorber first inlet 117. Thus, refrigerant absorber 110 defines a first inlet 117 for receiving stream 115 and a second inlet 119 for receiving stream 122', which exits refrigerant stripper outlet 201 and comprises mostly water (lean in ammonia). The refrigerant absorber 110 further defines a second outlet 121 in which liquid stream 116 rich in ammonia (e.g., about 30 weight percent ammonia and about 70 weight percent water) exits the refrigerant absorber 110 via stream 116.

Stream 116 passes through heat exchanger 118 where the constituents are heated and then heated stream 116 is sent back to, e.g., the refrigerant stripper 92 via stripper condenser 118' overhead section to extract more heat therefrom. Stream 120 exiting the CAP stripper condenser 118' typically comprises about 30 weight percent ammonia and about 70 weight percent water. A further example of the constituents of stream 120 is between about 20 weight percent ammonia to about 40 weight percent ammonia, balance water.

The stream 122' comprising, e.g. clean water, exits refrigerant stripper outlet 201, is cooled in heat exchanger 118 and enters the refrigerant absorber 110 via refrigerant absorber inlet 119. It is further noted that once ammonia is absorbed in the refrigerant absorber 110, heat is generated which needs to be removed. Accordingly, as further shown in FIG. 3, heat exchanger 126 can be employed to receive stream 124' comprising an ammonia and water solution from the refrigerant absorber 110 and cool this stream using refrigerant cooling water to remove heat. Cooled stream 128 exiting the heat exchanger 126 and comprising ammonia and water can then enter the refrigerant absorber 110 via refrigerant absorber inlet 129.

According to embodiments, refrigerant absorber 110 may comprise any suitable absorption refrigeration system, such as an ammonia-water system, lithium bromide (LiBr)-water system, and so forth, and typically operates at atmospheric conditions, but not limited to only atmospheric conditions. As will be appreciated, an absorber refrigeration system employs a heat source to drive the cooling of the system. As non-limiting examples, a solution of LiBr salt and water, or a solution of ammonia and water, can be employed in the refrigerant absorber 110. For a Li—Br-water system, water is the refrigerant and LiBr is the absorbent. However, it will be appreciated that for an ammonia-water system, ammonia is the refrigerant and water is the absorbent.

It is noted that to the inventor's knowledge such implementation of a refrigerant absorber 110 on, e.g., gas turbines, combined cycle power plants and CAP processing, as well as implementation/integration of, e.g., a stripper overhead in absorption refrigeration on combined cycle power plants has not been known before, and such implementation as described herein has resulted in a surprising reduction in overall power consumption.

Referring now to FIG. 4, set forth therein is another schematic depiction of an integrated $CO_2$ capture system for a combined cycle power plant by using absorption refrigeration and denoted by reference number 10'. It will be appreciated that system 10' of FIG. 4 is similar in some respects to system 10 of FIG. 3. Accordingly, like elements have been assigned like reference numbers. In contrast to the liquid refrigerant stream 100' of FIG. 3, stream 100 of FIG. 4 is a vapor stream. More specifically, in the embodiment of FIG. 3, the use of condenser 96 results in liquid refrigerant stream 100' exiting therefrom to enter into heat exchanger 101. In contrast, according to the embodiment depicted in FIG. 4, use of condenser 96 results in vapor refrigerant stream 100 exiting therefrom which then enters vapor refrigerant expander 102. Thereafter, vapor stream 100 enters heat exchanger 106, wherein stream 108 exiting the heat exchanger 106 comprises heated vapor refrigerant (e.g., ammonia refrigerant) and then enters the refrigerant absorber 110 via refrigerant absorber inlet 117, as shown in FIG. 4. It is further noted that heat exchanger 118 of FIG. 3 is also depicted in FIG. 4. Thus, in the embodiment of FIG. 4 if desired, liquid stream 116 rich in ammonia could pass through heat exchanger 118 prior to entering the refrigerant stripper 92, as in the case of FIG. 3. Thus, according to the embodiment of FIG. 4, the refrigerant can be recovered at higher pressure and then expands to generate power, which can be used within the CAP process to, e.g., drive a number of pumps, $CO_2$ compressor, and so forth. This processing can cool the refrigerant substantially below the ambient temperature conditions, e.g., in the case of an ammonia-water refrigeration absorber, during the expansion process, which can be used within the CAP process as a refrigerant medium to cool the process solution.

It is noted that the embodiment of FIG. 4 is particularly suitable when the refrigerant requirement is not large, for example, during sensible heating of the refrigerant. As an example, if about 1,000 Kilowatt (KW) is the cooling duty, then this may be achieved with either or both of the embodiments of FIG. 3 and FIG. 4. However, if the cooling duty is about 10,000 KW, then the embodiment of FIG. 3 may be employed. It will be appreciated that the foregoing is relative to the size of the overall plant, and $CO_2$ capture requirements. It will be further appreciated that the aforereferenced cooling loads are merely non-limiting examples as the values depend on such factors as size of the plant, and so forth. Similarly, it will be appreciated that while various processing parameters and flow constituents, including temperature, pressure, and so forth, have been set forth above, these parameters are merely exemplary (i.e., examples of) suitable parameters, which also may vary depending upon the particulars of the process, plant, and so forth.

Examples

A high level comparison between a mechanical refrigeration system and an absorption refrigeration system according to embodiments and as set forth in FIG. 3 was conducted at high ambient temperature conditions. More particularly, according to embodiments, the utilization of stripper overhead heat recovery with an absorption refrigeration system was employed.

Figure 5:
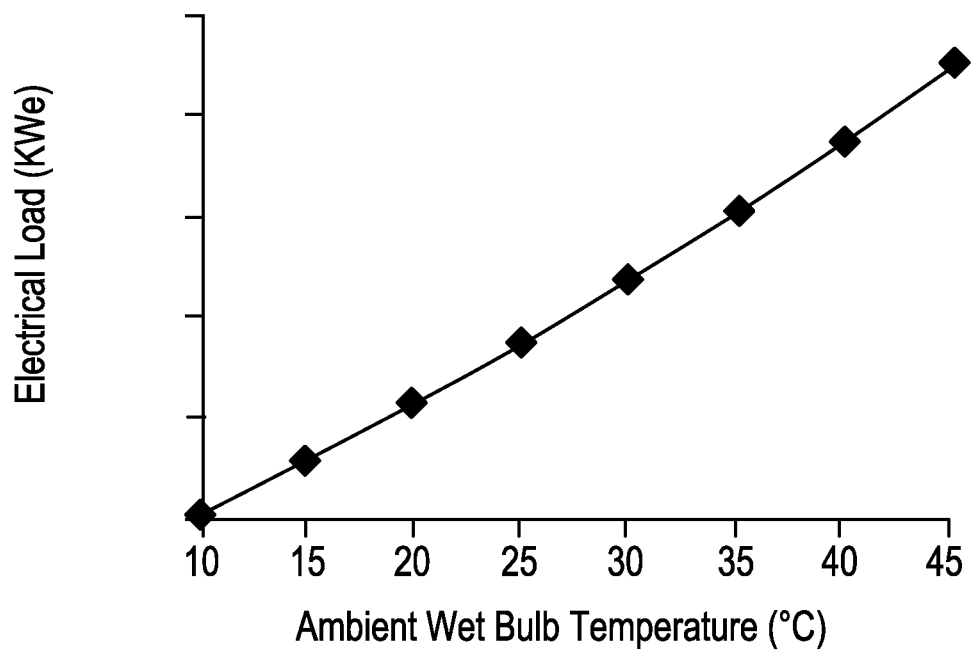
FIG. 5 is a graph depicting electrical load for mechanical refrigeration as a function of ambient temperature.
Figure 6:
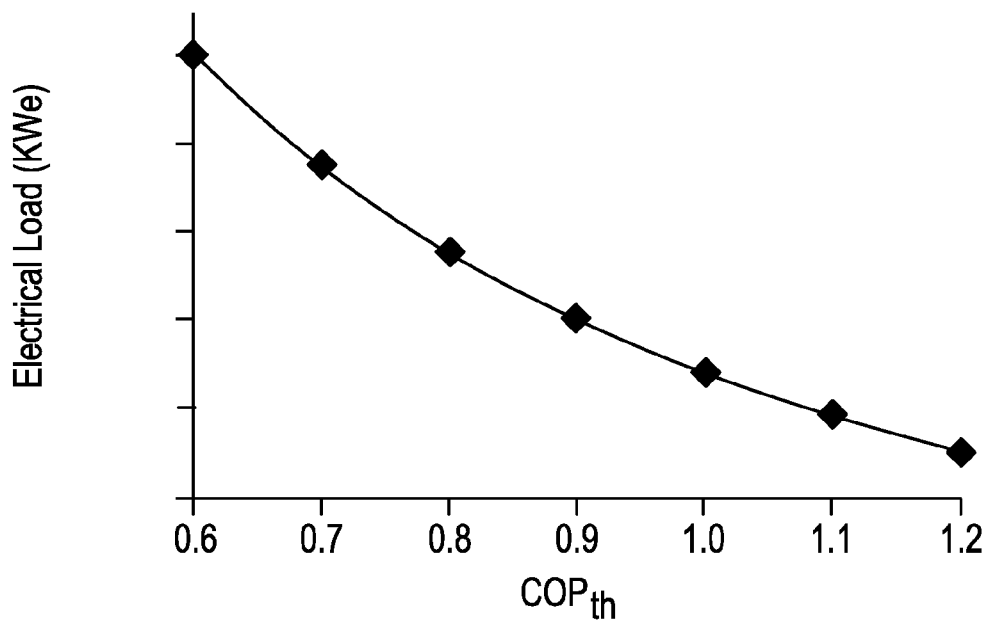
FIG. 6 is a graph depicting electrical load for absorption refrigeration as a function of COP.

A detailed operating energy assessment was performed for both the mechanical and absorption refrigeration systems and the results are set forth in FIGS. 5 and 6. As shown in FIG. 5, the electrical load for the mechanical refrigeration system increases at higher ambient temperatures. FIG. 6 presents the absorption refrigeration equivalent electrical load as a function of COP for the absorption refrigeration with a built in credit for the stripper overhead duty. The electrical load for the absorption refrigeration system decreases with an increase in COP. The electrical load could be reduced further by using a double effect absorption refrigeration system, which may further increase the COP of the absorption refrigeration.

Based upon the curves of FIGS. 5 and 6, a comparison of power consumption for the two systems at a 30° C. wet bulb temperature and absorber refrigeration COP of 0.8 resulted in a savings of approximately 40 to 50 percent power consumption for the absorber refrigeration system in comparison with the mechanical refrigeration system.

Figure 7:
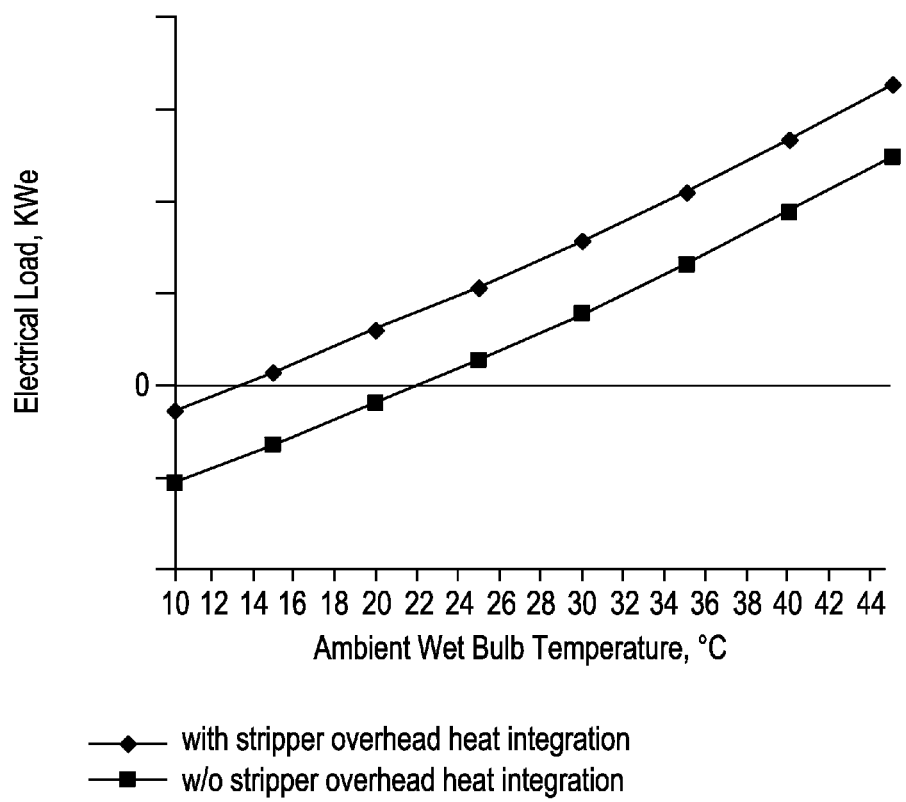
FIG. 7 is a graph depicting the difference between mechanical and absorption/absorber refrigeration system as a function of ambient temperature.

FIG. 7 provides the difference in energy between the mechanical and absorption/absorber refrigeration system as a function of ambient temperature. The analysis demonstrated that the absorption/absorber refrigeration performed better than the mechanical refrigeration system at certain tested ambient wet bulb temperatures. Moreover, the absorption/absorber refrigeration system is also advantageous at further tested ambient wet bulb temperatures, when a stripper overhead heat duty is integrated with the absorption/absorber refrigeration system, as shown in FIG. 7.

While the components of the systems set forth herein are described as having various numbers of inlets and outlets, the present disclosure is not limited in this regard as the components described herein may have any number of suitable inlets and/or outlets, as well as pumps, valves and so forth, without departing from the broader aspects disclosed herein. Similarly, while reference is herein made to various locations, such as top, bottom, and so forth, the present disclose is not limited to exact locations, as the various lines and streams disclosed herein can enter/exit at other locations. Still further, while various streams are disclosed herein as having exemplary (examples of) temperatures, pressures, and so forth, it will be appreciated by one of ordinary skill in the art that such parameters depend upon the particulars of the system and components employed therein, and thus can vary. For example, it will be appreciated that the temperature and pressure of, for instance, streams 76, 86, 94, and so forth, depend upon the refrigerant stripper 92 operating conditions.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A carbon dioxide removal system comprising:
    a chilled ammonia carbon capture system (CAP);
    an absorber refrigeration system in fluid communication with the chilled ammonia carbon capture system;
    a heat recovery steam generator (HRSG) in fluid communication with the chilled ammonia carbon capture system and the absorber refrigeration system;
    a refrigerant stripper and a reboiler both in fluid communication with the chilled ammonia carbon capture system, the absorber refrigeration system, and the HRSG; and
    a CAP stripper condenser in fluid communication with the refrigerant stripper and the absorber refrigeration system.

2. The carbon dioxide removal system of claim 1, wherein the reboiler is configured to receive steam, and the refrigerant stripper is configured to receive a vapor stream comprising ammonia and water from the reboiler.

3. The carbon dioxide removal system of claim 2, further comprising a condenser and a first heat exchanger, wherein the condenser is configured to receive a vapor refrigerant from the refrigerant stripper to condense the vapor refrigerant using a cooling medium, and the first heat exchanger is configured to receive the liquid refrigerant from the condenser to cool the refrigerant.

4. The carbon dioxide removal system of claim 3, wherein the absorber refrigeration system is selected from the group consisting of a LiBr-water system and an ammonia-water system.

5. The carbon dioxide removal system of claim 3, wherein the absorber refrigeration system is configured to receive refrigerant from the first heat exchanger.

6. The carbon dioxide removal system of claim 5, further comprising a second heat exchanger, wherein the second heat exchanger is configured to receive a liquid stream comprising the refrigerant from the absorber refrigeration system to produce a heated liquid stream comprising the refrigerant.

7. The carbon dioxide removal system of claim 6, wherein the CAP stripper condenser is configured to receive the heated liquid stream from the second heat exchanger comprising the refrigerant from the absorber refrigeration system and wherein the refrigerant stripper is configured to receive the heated liquid stream from the CAP stripper condenser.

8. The carbon dioxide removal system of claim 2, further comprising a condenser and a first heat exchanger, wherein the condenser is configured to receive a vapor refrigerant from the refrigerant stripper, and the first heat exchanger is configured to receive a liquid refrigerant.

9. The carbon dioxide removal system of claim 1, wherein the absorber refrigeration system is configured to operate at an ambient wet bulb temperature greater than about 5° C.

10. The carbon dioxide removal system of claim 9, wherein the absorber refrigeration system is configured to operate at an ambient wet bulb temperature greater than about 10° C.

11. The carbon dioxide removal system of claim 9, wherein the absorber refrigeration system is configured to operate at an ambient wet bulb temperature greater than about 15° C.

12. A method for reducing power consumed during a carbon capture process, comprising:
   in a carbon dioxide removal system comprising:
      a chilled ammonia carbon capture system;
      an absorber refrigeration system in fluid communication with the chilled ammonia carbon capture system (CAP); and
      a heat recovery steam generator (HRSG) in fluid communication with the chilled ammonia carbon capture system and the absorber refrigeration system;
   contacting the chilled ammonia carbon capture system with the absorber refrigeration system without the use of a mechanical refrigeration system; and further comprising:
      providing a heated liquid stream comprising ammonia from the absorber refrigeration system to a CAP stripper condenser; and
      providing the heated liquid stream from the CAP stripper condenser to a refrigerant stripper.

13. The method of claim 12, comprising contacting the chilled ammonia carbon capture system with the absorber refrigeration system without the use of a mechanical refrigeration system at an ambient wet bulb temperature of greater than about 5° C.

* * * * *